United States Patent [19]

Caveney

[11] 4,337,934

[45] Jul. 6, 1982

[54] ASSEMBLY POST

[75] Inventor: Jack E. Caveney, Hinsdale, Ill.

[73] Assignee: Panduit Corp., Tinley Park, Ill.

[21] Appl. No.: 198,406

[22] Filed: Oct. 20, 1980

[51] Int. Cl.[3] .............................................. B23Q 1/04

[52] U.S. Cl. ...................................... 269/77; 269/903; 29/755; 248/68 R

[58] Field of Search ..................... 269/903, 77, 78, 74, 269/71; 29/755, 760; 254/390, 139, 3 RA; 298/71, 68 R, 70, 297.1, 125; 140/92.1

[56] References Cited

U.S. PATENT DOCUMENTS

| | | | |
|---|---|---|---|
| 552,951 | 1/1896 | Bower et al. | 248/70 |
| 632,381 | 9/1899 | Theadore | 269/78 |
| 1,722,875 | 7/1929 | Wilson | 254/390 |
| 3,194,279 | 7/1965 | Brown | 29/755 |
| 3,258,039 | 6/1966 | Ewalt . | |
| 3,409,971 | 11/1968 | Morrow | 29/755 |
| 3,540,110 | 11/1970 | Schwartz . | |
| 3,839,777 | 10/1974 | Puzio . | |
| 3,905,570 | 9/1975 | Nieuwveld | 248/71 |
| 4,099,852 | 3/1977 | Bulanda . | |
| 4,278,223 | 7/1981 | Fauteux | 248/125 |

*Primary Examiner*—Robert C. Watson

*Attorney, Agent, or Firm*—Charles R. Wentzel; Richard B. Wakely

[57] ABSTRACT

An assembly post for holding a portion of elongate objects, such as wires to be formed into a bundle, elevated with respect to a wiring layout board and for defining a turn in the objects. The assembly post comprises means for mounting the post on the layout board and holding means supported by the mounting means for holding the elongate objects. The holding means is movable between an extended position wherein it supports the objects and a retracted position wherein it is closer to the layout board than in its extended position. The post also includes means for maintaining the holding means in its extended position during wiring of the bundle against a predetermined force greater than the weight of the portion of elongate objects whereby, after layout of the bundle, application of a force greater than the predetermined force causes movement of the holding means to its retracted position and permits application of a tying device and removal of the bundle without substantial interference from the post.

14 Claims, 9 Drawing Figures

ASSEMBLY POST

BACKGROUND OF THE INVENTION

This invention relates to harness or bundle assembly apparatus and, more particularly, to an assembly post for holding the bundle elevated on the layout board and for defining a turn in one or more wires in the bundle.

In the formation of a bundle from a plurality of flexible elongate objects such as wires, each wire is typically run individually on a wiring layout board between its desired termination points with the wire placed in a plurality of holding devices disposed along straight run portions of the desired bundle path. These holding devices generally tend to form the wires into a grouping of general circular cross section to permit convenient installation and tightening of cable ties. Examples of such holding devices and cable ties are disclosed in commonly assigned U.S. Pat. Nos. 4,029,277 and 3,872,547, respectively. Heretofore, objects such as nails or dowels were used as supports for forming a turn in the bundle. Such straight supports tended to disperse the wires from their circular grouping with the result that after a cable tie was applied near the support and after removal of the bundle from the layout board, the wires would reassume a circular cross-sectional grouping and since a circle has a smaller periphery for a given cross section than any other configuration, the cable tie would become unacceptably loose.

Several corner posts have been proposed which include a mounting base and a wire holder having a concave profile for engaging the wires. As a part of the holder extended at least partially over the wires, the bundle could not be pulled from the layout board without interference from the corner post. In one of these posts the holder had to be removed from the base thus causing a loose part the assembler had to keep track of and replace on the base before starting fabrication of another bundle. The other prior art posts have holders which must pivot as the completed bundle is removed. As space is required for pivoting, the use of such corner posts may be limited in high density wiring. Reference may be made to U.S. Pat. Nos. 3,540,110, 3,839,777 and 4,009,852.

SUMMARY OF THE INVENTION

Among the several objects of the present invention may be noted the provision of an improved assembly post which can be retracted to permit application of a cable tie to the bundle and removal of the bundle without interference from the post; the provision of such a post which retains the holder and avoids any loose pieces; the provision of such a post which can be easily mounted on the wiring board using only a hammer; and the provision of such apparatus which has long service life and which is simple and economical to manufacture. Other objects and features of the present invention will be in part apparent and will in part be pointed out in the following specification and in the claims attendant thereto. Briefly, the assembly post of the present invention includes means for mounting the post on a layout board and holding means supported by the mounting means for holding the wires to be formed into a bundle. The holding means is movable between an extended position and a retracted position closer to the layout board. The post also includes means for maintaining the holding means in its extended position during wiring.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
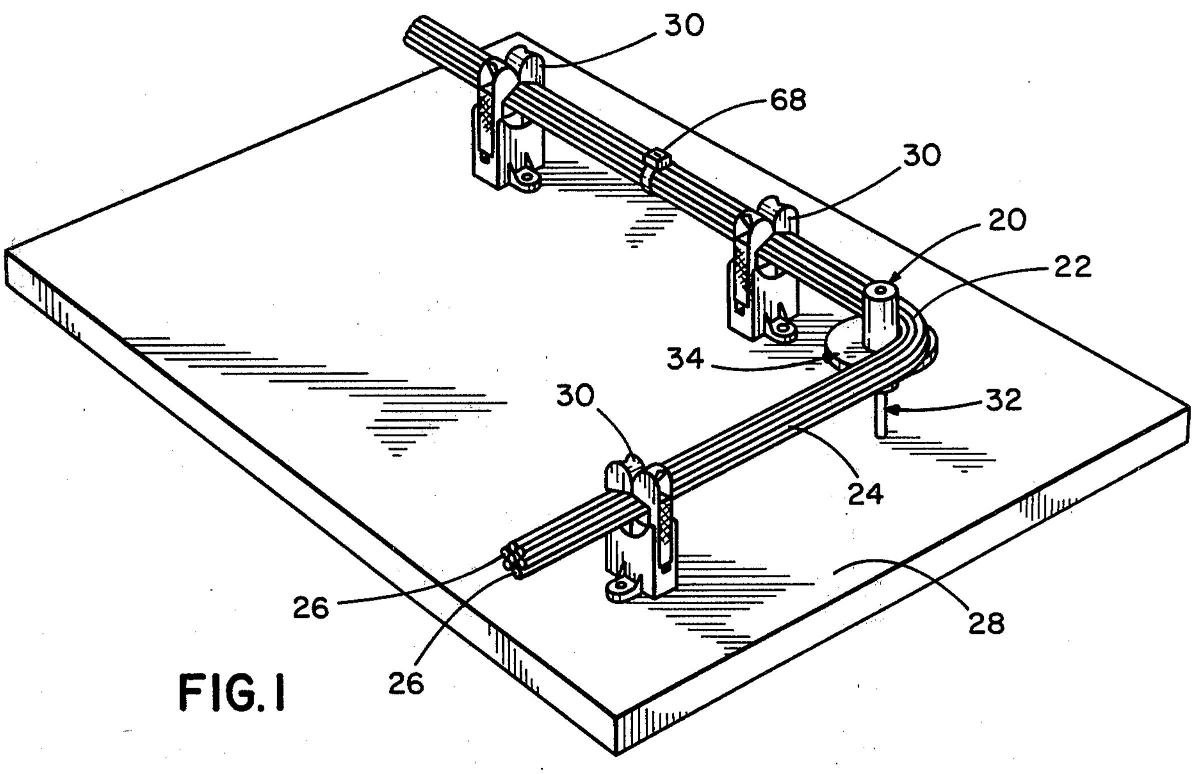
FIG. 1 is a perspective view of a wiring layout board including the assembly post of the present invention along with various other harness assembly equipment.
Figure 2:
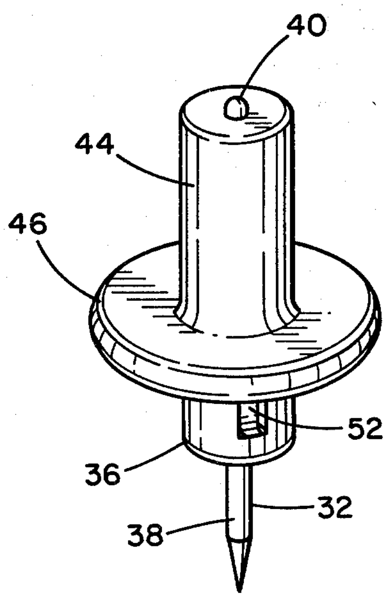
FIG. 2 is a perspective of the assembly post which includes mounting means in the form of a spindle and holding means in the form of a spool.
Figure 3:
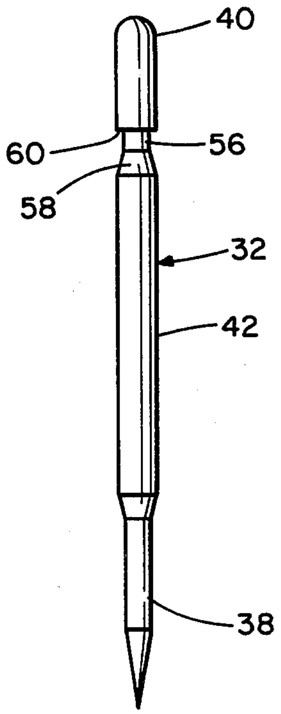
FIG. 3 is a side elevational view of the spindle.

Referring now to FIG. 1, an assembly post of the present invention is generally indicated by reference numeral 20. The post is useful for holding a portion of elongate objects, such as wires 26 to be formed into a bundle 24, elevated with respect to a wiring layout board 28 and for defining a turn 22 in one or more of the objects. Post 20 is used in conjunction with retainers 30 which form and support straight run portions of the desired bundle route. An example of such a holder is fully disclosed in commonly assigned U.S. Pat. No. 4,029,277 and it functions to form the objects into a bundle of generally circular cross section and to release the bundle upon being pulled straight upwardly away from board 28.

Figure 6:
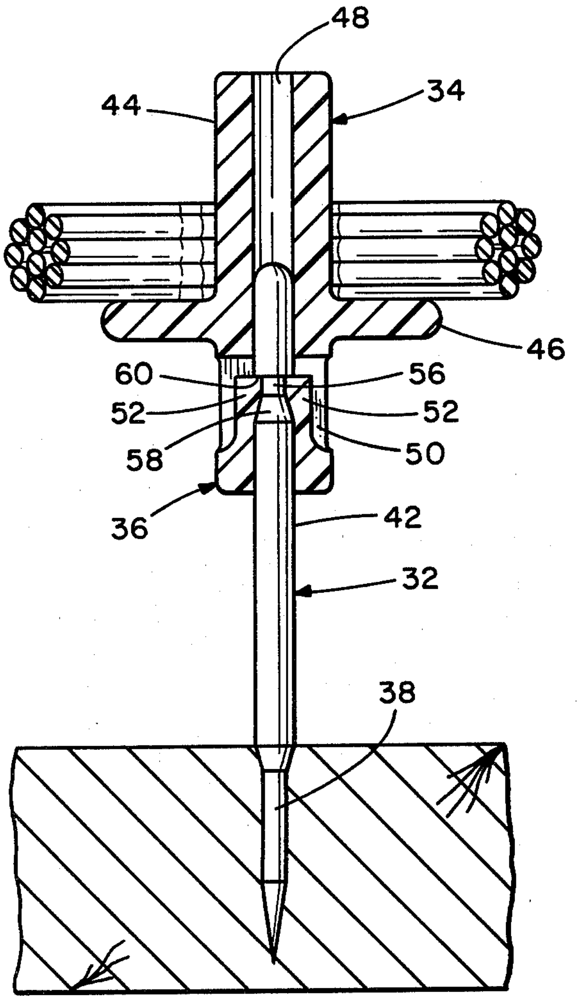
FIG. 6 depicts the assembly post in its extended position aiding in the formation of a bundle.

Assembly post 20 includes means for mounting the post on layout board 28 and holding means supported by the mounting means for holding the bundle spaced from the layout board. The mounting means comprises a spindle 32 while the holding means comprises a spool 34 rotatable about the spindle and slidable thereon between an extended position, as shown in FIG. 6, wherein the spool supports the objects as they are formed into a bundle and a retracted position, see FIG. 7, wherein the spool is closer layout board 28 and substantially below the pass line of the bundle. Post 20 further includes means for maintaining the spool 34 in its extended position during wiring against the weight of the objects comprising a collet 36 extending from spool 34. Preferably the collet and spool are of integral molded thermoplastic construction while spindle 32 is metallic.

More specifically, spindle 32 includes a mounting end 38 in the form of a nail terminating in a pointed tip for being driven into the layout board. The spindle also includes a head end 40 and an intermediate stem portion 42 on which the collet and spool are slidable.

Figure 4:
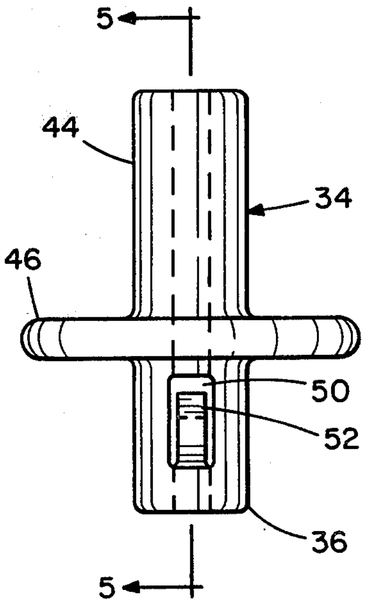
FIG. 4 is a side elevational view of the spool.
Figure 5:
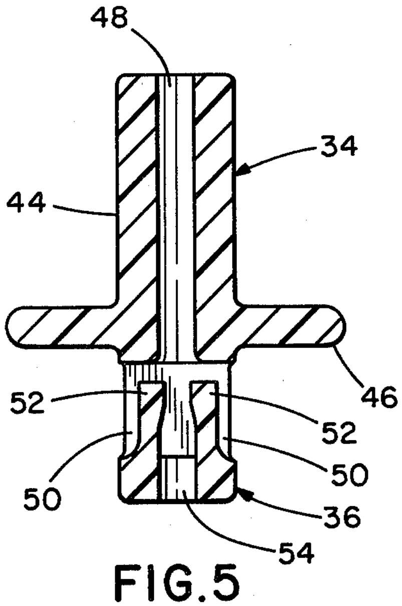
FIG. 5 is a sectional view of the spool taken generally along line 5—5 of FIG. 4.

Referring to FIGS. 4 and 5, spool 34 includes a cylindrical portion 44 for defining a turn in one or more of the objects and further includes a rim 46 for holding the objects spaced from layout board 28. A bore 48, of greater diameter than any part of spindle 32, is provided for receiving the spindle. Collet 36 is formed by a curved wall defining a bore 54 for receiving stem 42 and having a pair of diametrically opposed windows 50 with a resilient finger 52 extending as a cantilever inwardly into each window. The spacing between the distal ends of fingers 52 is less than the diameter of spindle stem 42 so that the fingers frictionally engage the stem to maintain the spool in its extended position against the force of gravity and the weight of the objects. Bore 54 is coaxial with bore 48 and is preferably of smaller diameter than the diameter of spindle head 40 to preclude incorrect (upside down) mounting of the spool on the spindle.

Stem 42 includes an annular groove 56 adjacent head 40 for seating fingers 52 when the spool is in its extended position. Groove 56 is bounded by an annular ramp surface 58 for camming apart fingers 52 as the spool is moved to its retracted position, and an annular radially extending surface 60 of head end 40 for abutting fingers 52. Surface 60 constitutes stop means for limiting movement of spool 34 away from layout board 28 so that after mounting of post 22 on the layout board, spool 34 cannot be removed from spindle 32.

Operation of the assembly post of the present invention is as follows: The post is mounted on layout board by inserting spindle 32 nail end first through spool 34 until the nail end extends from the collet. The nail end is driven into the layout board to mount the post. After post 20 and holders 30 are positioned on the layout board with the holders defining straight run portions of the bundle route and posts 20 extended and defining the desired bundle turns, wires 26 are placed in the holders and against the cylindrical portion 44 of spool 34. It is noted that since spool 34 easily rotates on the spindle 32 when in its extended position, post 20 can be used as an idler wheel to take up any slack in the bundle.

Figure 7:
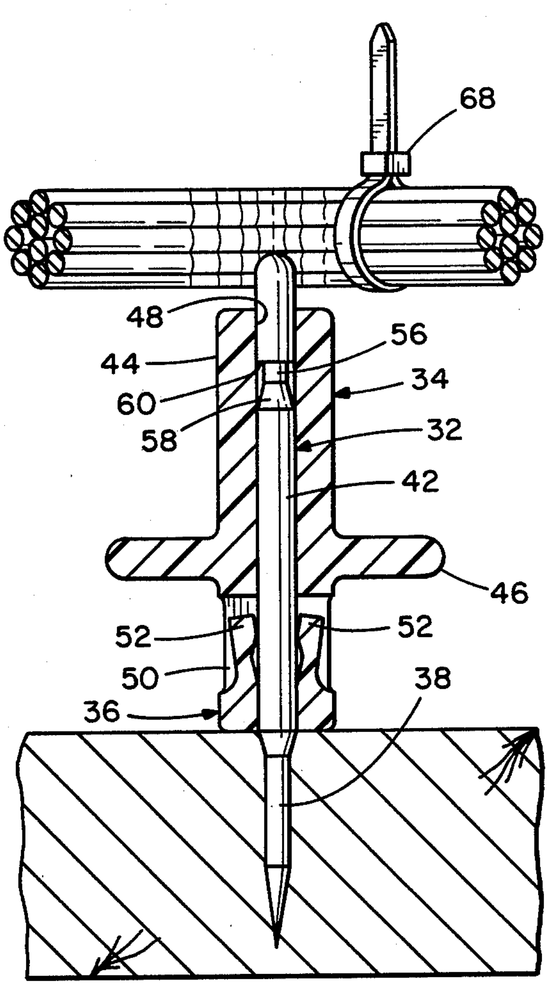
FIG. 7 illustrates the assembly post in its retracted position allowing the bundle to be tied and removed from the layout board without interference from the post.

Upon completion of the wiring, spool 34 can easily be moved to its retracted position by application of a predetermined force sufficient to cam fingers 52 apart, FIG. 7, since no portion of the spool extends over the wires. Thus cable ties 68 can be applied to form the wires into a bundle of circular cross section and the tied bundle can be moved from the board without interference from the post. After bundle removal, the spool is returned to its extended position for the formation of a subsequent bundle.

Figure 8:
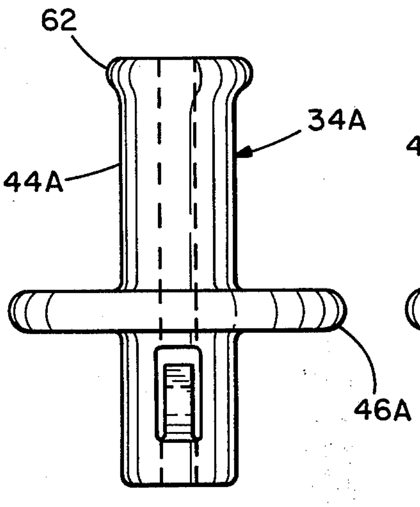
FIG. 8 is a side elevational view of a first alternate embodiment of the spool of FIG. 4.
Figure 9:
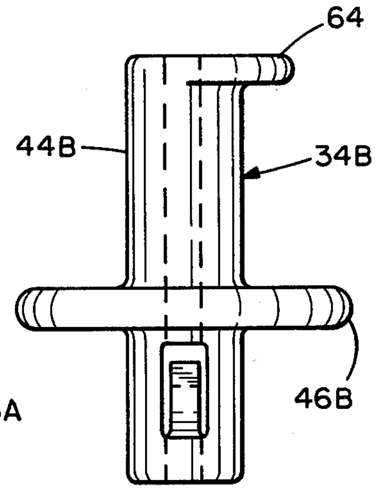
FIG. 9 is a side elevational view of a second alternate embodiment of the spool of FIG. 4.

As spool 34 is elongate, during wiring of a moderately sized bundle ordinary care of the assembler will prevent wires from slipping over the top of the spool. For the formation of a very large bundle an alternate embodiment of the spool 34A, shown in FIG. 8, includes a small rim 62 disposed at the end of the cylindrical portion 44A remote from larger rim 46A. A second alternate embodiment of the spool 34B, shown in FIG. 9, includes a radially extending arm 64 at the end of the cylindrical portion 44B remote from rim 46B.

Operation of the alternate embodiments of the spool is the same as that previously described except that using spool 34A, the wires must be slightly deflected away from the spool before moving it to its retracted position. For spool 34B the arm 64 is positioned to extend outside the turn during wiring. Upon completion of wiring the spool is rotated so that the arm extends inside the turn where no wires underlie the arm allowing the spool to be easily retracted without interference from the wires.

In view of the above, it will be seen that the several objects of the invention are achieved and other advantageous results attained.

As various changes could be made in the above constructions without departing from the scope of the invention it is intended that all matter contained in the above description shall be interpreted as illustrative and not in a limiting sense.

What is claimed is:

1. An assembly post for holding a portion of elongate objects, such as wires to be formed into a bundle, elevated with respect to a wiring layout board used in the formation of said bundle and for defining a turn in one or more of said objects, said assembly post comprising:

means for mounting said assembly post on said layout board;

holding means supported by said mounting means for holding said portion of said elongate objects, said holding means being movable between an extended position wherein it supports said objects as they are formed into a bundle and a retracted position wherein said holding means is closer to said layout board than in its extended position; and means for maintaining said holding means in its extended position during wiring of said bundle against a predetermined force greater than the weight of said portion of elongate objects whereby, after layout of the bundle, application of a force greater than said predetermined force causes movement of said holding means to its retracted position and permits application of a tying device and removal of said bundle without substantial interference from said assembly post, said maintaining means comprises a collet extending from said holding means, said collet having a bore for slidably receiving said mounting means, said collet being formed by a curved wall having a window therein, said maintaining means further comprising a resilient finger extending into the window with the distal end of the finger frictionally engaging said mounting means.

2. An assembly post for holding a portion of wires to be formed into a bundle elevated with respect to a wiring layout board and for defining a turn in one or more of said wires, said post comprising:

a spindle adapted for mounting on said layout board;

a spool having a bore for receiving said spindle, said spool being rotatable about said spindle and slidable on said spindle between an extended position spaced from said layout board and a retracted position closer said layout board, said spindle comprising a cylindrical portion for defining a turn in a wire and a rim for supporting said wires; and means for maintaining said spool in its extended position and rotatable during wiring of said bundle against a predetermined force greater than the weight of said portion of wires whereby, after layout of said bundle, application of a force greater than said predetermined force causes movement of said spool to its retracted position and permits application of a tying device and removal of said bundle without substantial interference from said assembly post, said means for maintaining including resilient means frictionally engaging said spindle.

3. A post as set forth in claim 2 wherein said rim is a lower rim disposed adjacent one end of said cylindrical portion.

4. A post as set forth in claim 3 wherein said spool further comprises an upper rim disposed at the other end of said cylindrical portion.

5. A post as set forth in claim 3 wherein said spool further comprises a radially extending arm at the end of said cylindrical portion opposite said rim.

6. The combination of a plurality of wires to be formed into a bundle and an assembly post for holding a portion of said wires elevated with respect to a wiring layout board and for defining a turn in said wires, said assembly post comprising:

means for mounting said assembly post on said layout board;

holding means supported by said mounting means for holding said portion of said wires, said holding means being movable between an extended position wherein it supports said wires as they are formed into a bundle and a retracted position wherein said holding means is closer to said layout board than in its extended position; and means for maintaining said holding means in its extended position during wiring of said bundle against a predetermined force greater than the weight of said portion of wires, said means for maintaining comprising a collet having an aperture for receiving said mounting means and further comprising resilient means extending between said collet and mounting means and frictionally engaging one of said collet and mounting means.

7. The combination as set forth in claim 6 wherein said holding means is made of thermoplastic material, said mounting means is of metallic construction and said maintaining means is integral with said holding means.

8. The combination as set forth in claim 6 wherein said holding means is slidable on said mounting means and wherein said mounting means comprises stop means for limiting movement of said holding means away from said layout board.

9. The combination as set forth in claim 6 wherein said mounting means is elongate and comprises a mounting end, a head end and an intermediate stem portion on which said holding means is slidable.

10. The combination as set forth in claim 9 wherein said mounting end is in the form of a nail terminating in a pointed tip for being driven into said layout board.

11. The combination as set forth in claim 9 wherein said head end comprises a stop for limiting movement of said holding means away from said layout board.

12. The combination as set forth in claim 6 wherein said holding means comprises a spool having a cylindrical portion for defining a turn in one or more of said wires and a rim for holding said portion of said wires spaced from said layout board.

13. The combination as set forth in claim 9 wherein said resilient means engages said stem portion and said stem portion includes an annular groove disposed adjacent said head end for seating said resilient means.

14. The combination as set forth in claim 13 wherein said resilient means comprises at least one resilient finger, said groove being bounded by said head end and an annular ramp surface for outwardly camming said finger as said holding means is moved from its extended position.

* * * * *